Nov. 3, 1925.

G. C. DAVISON 1,560,043

TRACTOR

Filed April 17, 1920     5 Sheets-Sheet 1

Witnesses:
Harry R. White
W. F. Kilroy

Inventor:
Gregory C. Davison

By Brown, Boettcher & Clemmer
Attys

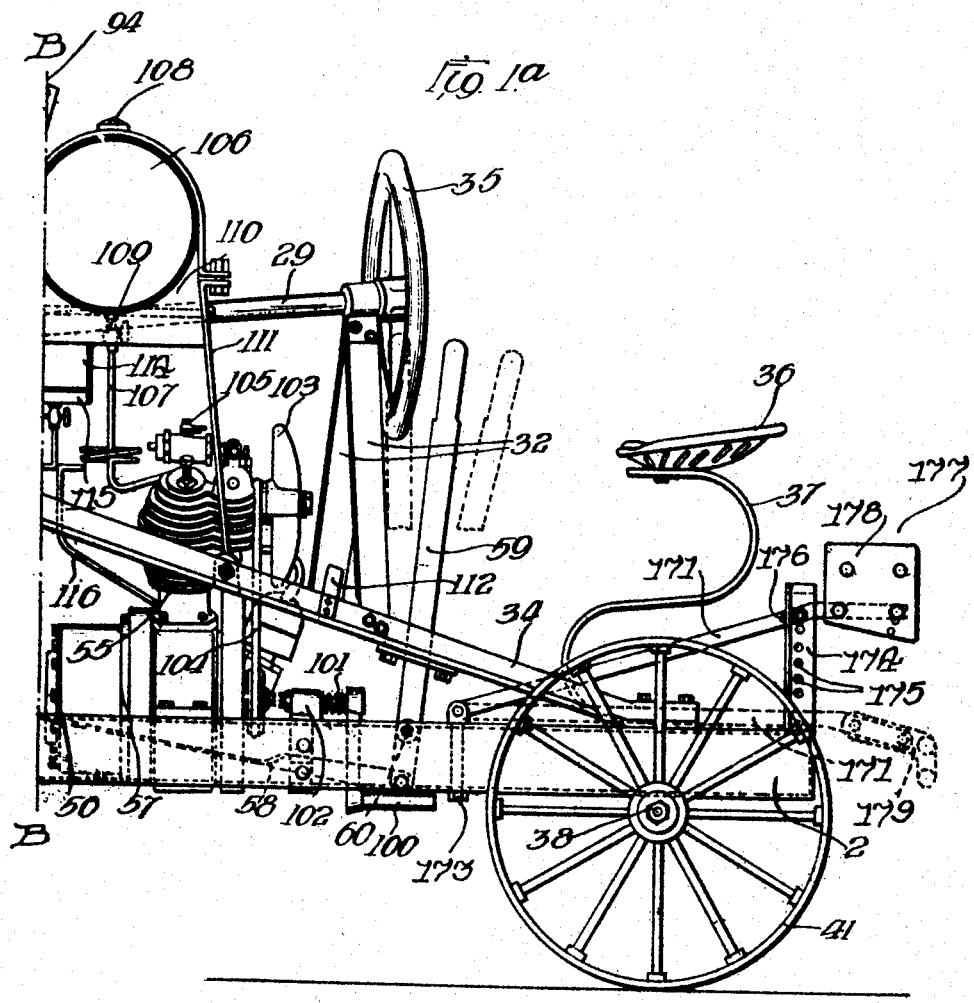

Nov. 3, 1925.　　　　　　　　　　　　　　　　　　　1,560,043
G. C. DAVISON
TRACTOR
Filed April 17, 1920　　　　　　5 Sheets-Sheet 3
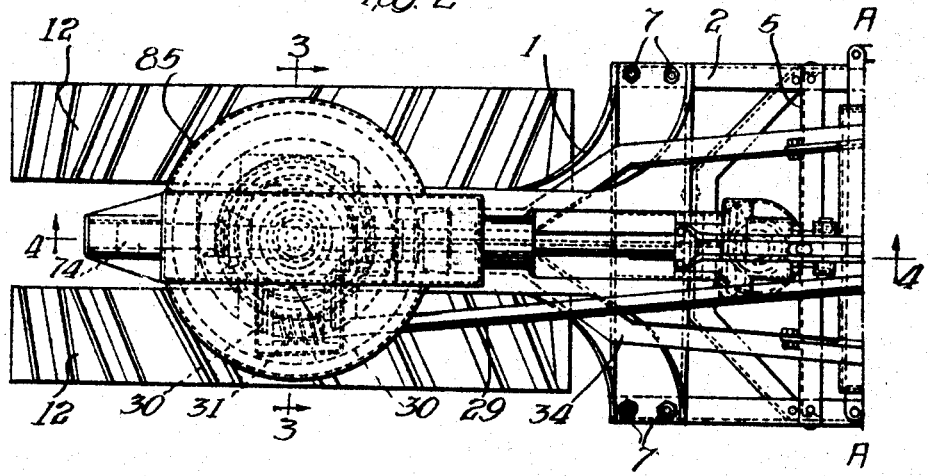
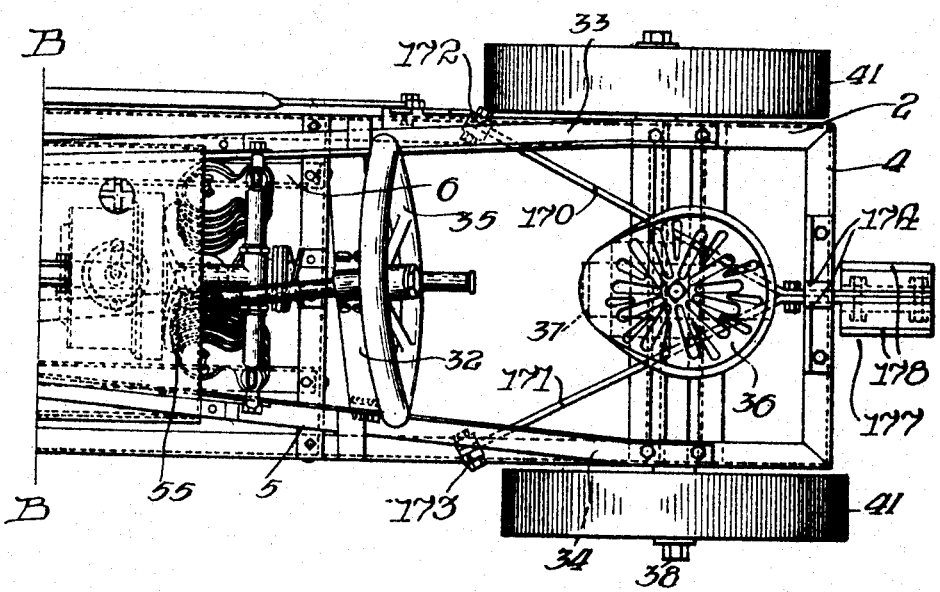
Witnesses:
Harry R. L. White
W. F. Kilroy
Inventor:
Gregory C. Davison
By Brown, Boettcher & Wiener
Attys

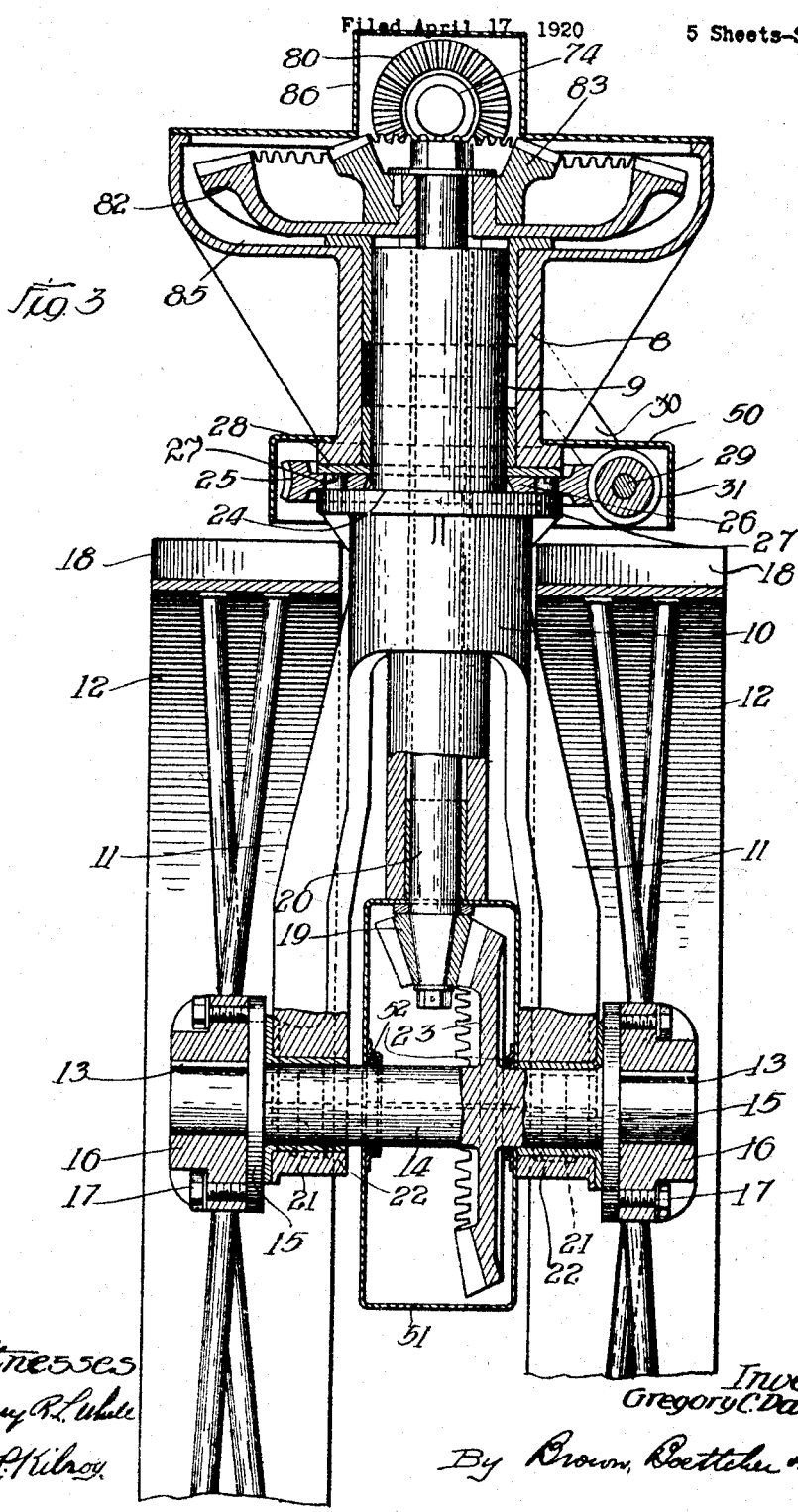

Nov. 3, 1925.
G. C. DAVISON
TRACTOR
Filed April 17, 1920
1,560,043
5 Sheets-Sheet 5
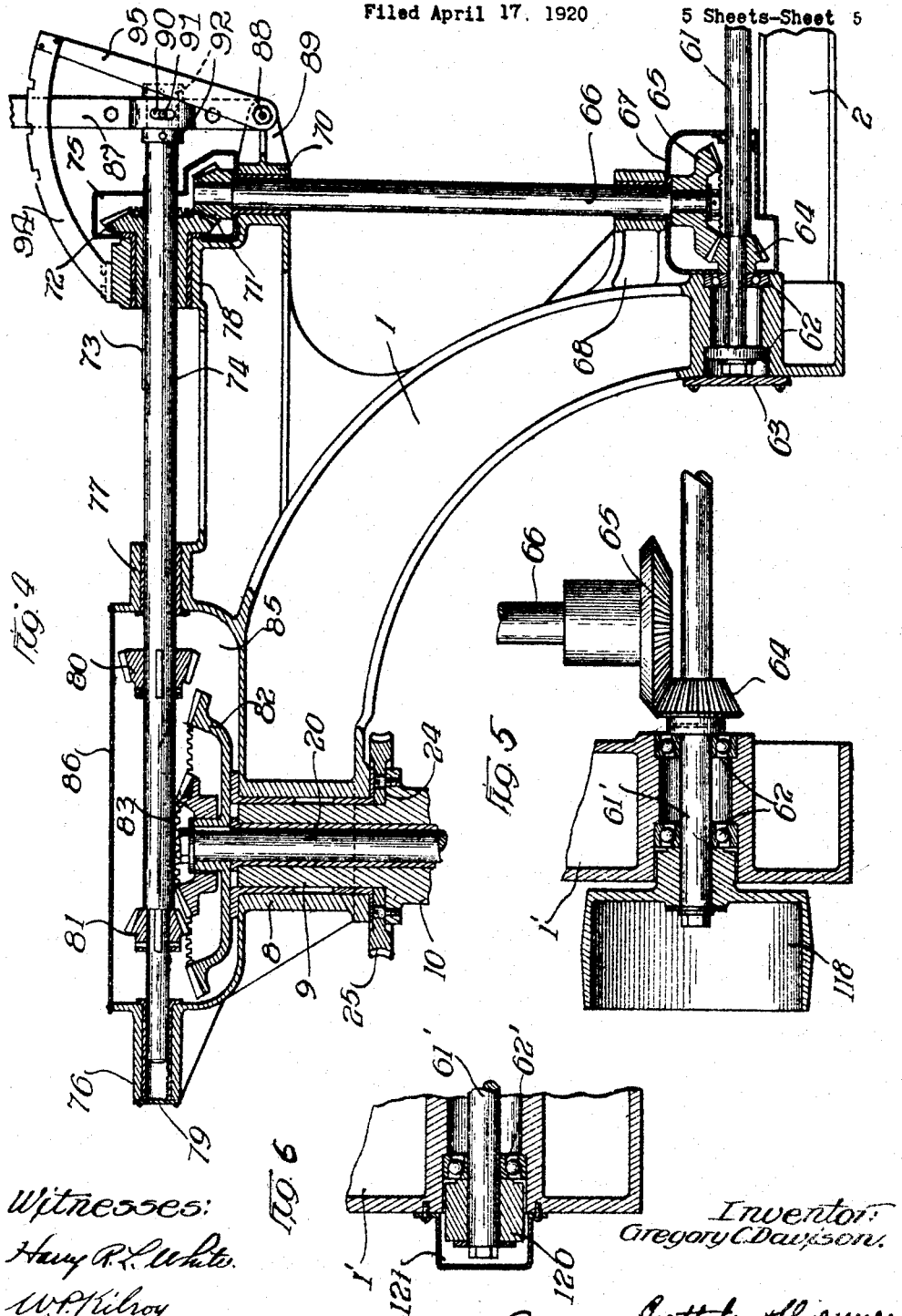

Patented Nov. 3, 1925.

1,560,043

UNITED STATES PATENT OFFICE.

GREGORY C. DAVISON, OF NEW LONDON, CONNECTICUT.

TRACTOR.

Application filed April 17, 1920. Serial No. 374,544.

*To all whom it may concern:*

Be it known that I, GREGORY C. DAVISON, a citizen of the United States, residing at New London, in the county of New London and State of Connecticut, have invented a certain new and useful Improvement in Tractors, of which the following is a full, clear, concise, and exact description, reference being had to the accompanying drawings, forming a part of this specification.

My invention relates to tractors and more particularly to tractors of the general type disclosed in my co-pending application, Serial No. 340,229, filed November 24, 1919.

In my above referred to application I have provided a tractor which is simple, efficient and comparatively inexpensive in its construction, easy to handle, control and maneuver, both as to driving and steering and otherwise admirably adapted to the performance of its work in a superior, more efficient and effective manner than had theretofore been attained.

The present invention, which is in the nature of an improvement on the above application, has for its object or aim the perfecting of the form or construction of various mechanisms and devices included in the tractor set out in the above application and the provision of a number of novel mechanisms, devices and structural improvements not disclosed therein. These novel mechanisms, devices, structural improvements and perfections are therefore one of the features of the present application.

The novel provisions of the present invention are:

(*a*) An improved drive or transmission between the engine and the traction wheels of the vehicle, (*b*) A novel change speed mechanism between the engine and the traction wheels, (*c*) An improved steering gear.

Other aims and novel features of the invention will appear from the following detailed description and claims, taken with an inspection of the accompanying drawings, in which:

Figure 1 is a side elevational view of the forward portion of a tractor embodying the features of the present invention;

Figure 1ᴬ is a side elevational view of the rear or after portion of a tractor embodying the features of the present invention (a complete side elevation of the tractor is provided by arranging Figure 1ᴬ to the right of Figure 1 with the line BB thereof coincident with the line AA of Figure 1);

Figure 2 is a plan view of that portion of the tractor shown in Figure 1;

Figure 2ᴬ is a plan view of that portion of the tractor shown in Figure 1ᴬ (a complete plan view of the tractor is provided by arranging Figure 2ᴬ to the right of Figure 2 with the line BB thereof coincident with the line AA of Figure 2);

Figure 3 is an enlarged vertical transverse sectional view taken substantially on the line 3—3 of Figure 2;

Figure 4 is an enlarged longitudinal vertical sectional view taken substantially on the line 4—4 of Figure 2;

Figure 5 is an enlarged axial section through the bearing at the forward end of the main driving shaft showing a pulley mounted upon the accessible end of the driving shaft;

Figure 6 is a view similar to Figure 5 showing the driving pulley removed and a dust cap mounted in place.

Figure 1:
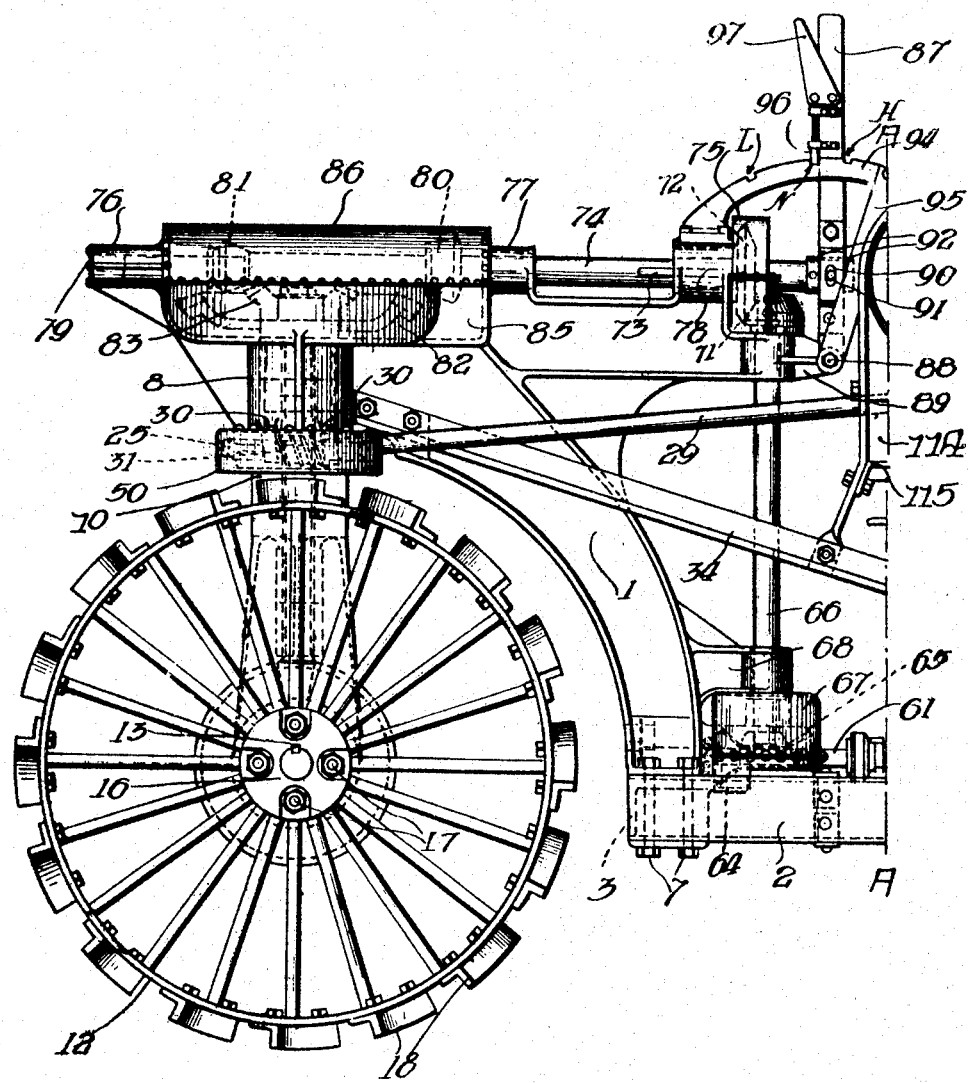

Before proceeding with the detailed description of the particular construction illustrated in the drawings, I wish to point out that while I have shown all of the features of the present invention as being applied to a tractor of the general type disclosed in my co-pending application, Serial No. 340,229, filed November 24, 1919, I do not by such disclosure intend to limit certain features to their application to such particular type of tractor except as I may hereinafter do so in the claims.

Bearing the foregoing in mind, I will now describe in detail the particular construction illustrated in the drawings.

The main frame of the vehicle comprises a forward frame section 1 and a rear or after frame section 2. The rear or after frame section 2 comprises generally a pair of longitudinal side rails connected at their forward and after ends through end rails or sills 3 and 4 respectively arranged transversely therebetween. The longitudinal side rails of the frame section 2 are additionally braced at various points throughout their length through suitable transverse rails or braces 5 arranged therebetween. Longitudinal rails 6 (Figure 2ᴬ) arranged across the transverse braces 5 provide a suitable engine supporting frame.

The forward frame section 1 is in the nature of a relatively massive upwardly arched arm secured at its inner end through suitable bolts 7 to the transverse rail or sill member 3 arranged between the forward ends of the longitudinal side rails of the rear frame section 2. At its forward end the upwardly arched frame section 1 is provided with a bearing head 8 for the reception of the upright hollow spindle 9 (Figure 3) of the front axle yoke 10. It is to be noted that the forward frame section 1 carries substantially all of the main bearings of the vehicle.

The front axle yoke 10 (Figure 3) revolvably mounted, through the upright spindle or standard 9, in the bearing head 8 at the forward end of the arched frame section 1, includes a pair of downwardly extending arms 11—11. The driving or traction wheels 12—12 of the vehicle are keyed, splined or otherwise suitably fixed as shown at 13, upon the spindles projecting from the opposite ends respectively of the front axle 14, which front axle 14 is rotatably mounted intermediate the wheels 12—12 in the downwardly extending arms 11—11 of the front axle yoke 10.

The front axle 14 is provided with integral annular flanges 15—15 adjacent the termination of the opposite ends thereof in the spindles upon which the wheels are mounted. The hubs or centers 16 of the wheels 12 are bored and tapped as are the annular flanges 15, for the reception of suitable bolts 17, whereby the wheels are secured against axial or longitudinal movement relative the axle 14. The outer faces of the hubs 16 are milled or otherwise provided with suitable depressions for the reception of the heads of the bolts 17, giving a finished appearance and removing the bolts from accidental access, such as might result in displacement thereof, or shearing of the heads therefrom. The wheels 12—12 may be provided with any usual or preferred type of tread plates or blades 18.

It is to be noted that the mountings provided for the front axle 14 in the downwardly extending arms 11—11 of the yoke 10 are in the nature of split bearings. With this arrangement the front axle 14 and the driving or traction wheels 12—12 may be assembled into one unit and after the main driving pinion 19 has been secured or fixed upon the lower end of the vertically arranged driving shaft 20, this unit may then be arranged in the lower ends of the arms 11—11 and the cap bearings 21 then secured in place as by means of suitable bolts 22. Upon proper arrangement of the front axle in the bearings adjacent its opposite ends, the driving gear 23, which driving gear is, in this particular instance, formed integral with the front axle 14, is intermeshed with the driving pinion 19.

The termination of the axle yoke 10 in the upright hollow spindle 9 provides an annular shoulder 24 about the axle yoke. A worm gear 25 mounted upon the spindle 9 is provided with a bored web portion 26, which web portion 26 engages the annular shoulder 24. Set screws 27 threaded into the annular shoulder 24 are provided with suitable heads, which heads engage or are received in suitable apertures provided about the web portion 26 of the worm gear 25, thereby in effect fixing the gear 25 rigidly to the yoke 10 to prevent relative rotation therebetween. A thrust washer 28 is arranged between the upper face of the web 26 of the worm gear 25 and the lower edge of the bearing head 8 carried by the forward end of the arched frame member 1.

Steering of the vehicle is accomplished through a steering shaft 29, whereby the front axle yoke 10 is rotated about the axis of the upright spindle 9 thereof. The forward end of the steering shaft 29 is supported in a pair of bearing arms 30—30 formed integral with and projecting from the bearing head 8 at the forward end of the arched frame section 1 and carries a steering worm 31 which steering worm 31 meshes with the worm gear 25. The rear end of the steering shaft 29 bears in a supporting bracket member 32, which supporting bracket member comprises a bearing sleeve having a pair of supporting legs mounted in an upright position upon a pair of longitudinal side braces 33 and 34 respectively, which longitudinal side braces converge at their forward ends and are secured through suitable bolts or otherwise to the upwardly arched arm 1 adjacent the bearing head 8. The rear downwardly diverging ends of the side braces 33 and 34 are secured through suitable bolts or otherwise to the longitudinal side rails respectively of the rear or after frame section 2. A steering or hand wheel 35 is fixed upon the steering shaft 29 for convenient access from the driver's seat 36. The longitudinal side braces 33 and 34 in addition to forming an effective mounting or support for various devices of the vehicle, strengthen and brace the entire chassis frame.

The driver's seat 36 is mounted upon the upper free end of a seat spring 37, the lower end of which seat spring is mounted upon cross supports arranged across the longitudinal side rails of the frame section 2 just over the rear axle 38 which carries rear wheels 41—41 of the vehicle.

The worm gear 25 and steering worm 31 are encased in a housing or casing 50 secured in any suitable manner to the bearing head 8 at the forward end of the arched frame section 1.

The driving gear 23 and pinion 19 are encased in a housing or casing 51, which casing 51 provides protection for these gears and also holds lubricating oil which insures that the gears are always well lubricated. Suitable dust or oil washers 52 are provided adjacent the axial openings on each side of the gear casing 51 to exclude dust or other foreign substances from the interior thereof and to prevent the leakage of oil.

The power plant of the vehicle comprises in this particular instance a twin cylinder air cooled engine 55 mounted upon the engine supporting frame work 6, which engine supporting frame work is in turn mounted upon the main frame section 2 as hereinbefore set forth. A friction clutch 56 of the usual or any preferred type is bolted or otherwise suitably secured to the fly wheel 57 located at the forward end of the engine bed. A suitable shifting arm connected to the clutch 56 is operated through a link 58 by means of a hand lever 59. The upper end of the hand lever 59, which hand lever is pivoted at 60 (Figure 1A) is arranged for convenient access from the driver's seat 36.

The forward end of the clutch or engine shaft 61 enters and is mounted in suitable radial bearings 62 (Figure 4) mounted in a co-axial bore provided in the arched frame section 1 adjacent its point of attachment with the frame section 2. Dust and other foreign substances are excluded from these bearings by means of a suitable dust cap 63 secured to the forward base of the arched frame section 1.

A bevel pinion 64 fixed upon the clutch or engine shaft 61 adjacent the rear face of the frame section 1 meshes with a bevel gear 65 fixed upon the lower end of an intermediate vertical shaft 66. The gear 65 and pinion 64 are encased in a housing or casing 67 which casing protects these gears and also holds lubricating oil, which insures that the gears are always well lubricated. Suitable dust washers provided adjacent such openings as are necessary, through this gear case, exclude dust and the like therefrom and prevent the leakage of oil. The vertical shaft 66 is mounted adjacent the upper face of the bevel gear 65 in a bearing arm 68 formed integral with and projecting inwardly from the rear face of the frame section 1. The upper end of the shaft 66 is mounted in a suitable bearing 70 provided in the frame section 1 and carries a pinion 71 securely fixed thereupon.

The pinion 71 meshes with a bevel gear 72 splined as shown at 73 upon an intermediate horizontal shaft 74. It will be seen that while the gear 72 is splined against rotation relative the shaft 74, axial movement of the shaft 74 through the gear is permitted for a purpose which will be hereinafter made apparent. The gear 72 and pinion 71 are arranged in a substantially dust and oil tight casing 75. The arched frame section 1 is provided with bearings 76—77 and 78 in which bearings the intermediate horizontal shaft 74 is slidably mounted. Dust and the like is excluded from the forward end of the bearing 76 by means of a suitable dust cap 79 provided therefor.

Low and high speed driving pinions 80 and 81 respectively are fixed upon the shaft 74 for co-operation with suitable low and high speed bevel gears 82 and 83 respectively fixed upon the upper end of the driving shaft 20, which driving shaft 20 is rotatably mounted in the revolvable front axle yoke 10. The gears 82 and 83 and pinions 80 and 81 are encased in a substantially dust and oil tight casing 85 having a suitable cover 86 through which access to the change speed gearing may be readily had.

The horizontal intermediate shaft 74 is shifted axially to move the pinions 80 and 81 into and out of mesh with their respective driven gears 82 and 83 to change the speed of the tractor. The shifting of this shaft 74 is accomplished by means of a hand lever 87. The lower end of this hand lever is pivotally mounted at 88 upon a bracket member 89 carried by the frame section 1. Within its length the lever 87 is provided with a slot 90 for the reception of a pin 91 through which pin 91 and the collars 92 mounted upon the shaft 74 such shaft is shifted axially upon swinging the lever 87 about its pivot 88. The length of the slot 90 allows for the various angular positions of the lever 87.

A pair of rack segments 94 are secured at one end to the frame section 1 and mounted at the opposite end upon a supporting arm 95 the lower end of which supporting arm is mounted upon the bracket member 89. Suitable high speed neutral and low speed notches H, N and L are provided in the upper periphery of the rack segments 94 so that the change gear lever 87, which operates between the segments will, upon being moved into high, neutral or low speed, be locked in such position by reason of the engagement therewith of a spring pressed latch or detent 96. The latch or detent 96 is released from either of the notches H, N or L by means of the hand latch releasing member 97 pivoted to the hand lever 87.

With the hand lever 87 in neutral position and the pinions 80 and 81 in the position shown in Figures 1 and 4, the vehicle may be readily towed or pushed to any desired place. High speed ahead is attained by releasing the detent 96 from the notch N and swinging the lever 87 in a clockwise direction about its pivot 88 to that point at which the detent engages the notch H whereby the shaft 74 is shifted longitudinally inwardly and the pinion 81 moved into mesh with the gear 83. High speed reverse is attained by rotating the front axle yoke 10 either to the right or left as is most convenient to the operator through substantially one half revolution or 180 deg. by means of the hand or steering wheel 35. By this operation the bevel driving gear 23 is rotated about the pinion 19 from the right hand side thereof (Figure 3) to the left hand side. This operation can be accomplished with the clutch still in, the engine running and the vehicle moving forwardly.

With the shaft 74 in the position shown in Figures 1 and 4 slow speed reverse is attained by swinging the lever 87 in a counterclockwise direction about its pivot 88, shifting the shaft 74 longitudinally outwardly and the pinion 80 into mesh with its co-operating gear 82. Slow speed ahead may then be attained by rotating the front axle yoke 10 either to the right or left through substantially one half revolution, or 180 deg., by means of the hand or steering wheel 35. Rotation of the axle yoke 10 can be carried out with the clutch 56 in, in which event the tractor will swing out to a certain extent from its straight course until the yoke has turned through 90 deg., the other 90 deg. rotation backing the tractor up in the same radius that it made in turning the first 90 deg. or the clutch can be thrown out and the wheels turned through the entire arc of 180 deg. while the vehicle remains stationary.

The engine 55 is provided with a starting crank 100 carried in a supporting bracket 102 and normally retained out of engagement with the engine shaft as by means of a suitable coiled spring 101. The cooling fan 103 is driven by the engine as through a suitable belt 104. Combustible mixture is supplied the engine from a carburetor 105 which carburetor in turn receives a fuel supply from a tank 106 by way of the pipe line 107. The fuel tank 106 is provided with a suitable filling plug 108 and shut off cock 109 and is supported in a cradle 110, which cradle is in turn mounted through steel straps or supporting legs 111 in an upright position upon the longitudinally extending side braces 33 and 34 of the vehicle. The longitudinal side braces are provided with suitable foot rests 112 as clearly shown in Figure 1^A.

A lubricating oil tank 114 mounted just below the fuel tank 106 through one of the supporting legs 111 and a bracket member 115 supplies lubricating oil to the various parts requiring lubrication through a suitable pipe line 116.

In Figures 5 and 6 I have shown an enlarged axial section through a slightly modified bearing at the forward end of the clutch or engine shaft 61 whereby the use of a pulley 118 in connection therewith is facilitated. In this instance the foremost of the bearings 62' is set in from the outer face of the frame section 1' so that the forward end of the shaft 61' will project forwardly therefrom and it is upon this forwardly projecting end that the pulley 118 is adapted to be fixed. Thus upon mounting the pulley in place and setting the change speed gearing of the vehicle in neutral, the power of the vehicle can be applied in various connections through the pulley 118 and a suitable belt (not shown). When the pulley 118 has served its purpose it is preferably removed, a spacer 120 (Figure 6) substituted therefor and a dust cap 121 mounted upon the outer face of the frame section 1' to exclude dust and the like from the bearings and prevent the leakage of oil.

The tractor herein described is strong, durable, compact, highly efficient, easy to handle, control and maneuver, both as to driving and steering and is of small cost.

The novel feature of securing high speed forward, neutral and low speed reverse through three positions of a readily accessible hand lever and then low speed forward and high speed reverse through the same three positions of the same hand lever by rotating the front axle yoke through substantially 180 degrees is a highly important aspect of my invention.

I do not intend to limit the invention to the particular details shown and described, as I am aware that modifications, changes and substitutions may be made within the scope of the invention and I have drawn the appended claims accordingly.

I claim:

1. In a tractor the combination of a frame, a drive wheel, a shaft having driving connection with said drive wheel, a pair of driving members on said shaft, an axially shiftable driving shaft and a pair of driving members each mounted on said shaft for rotation and axial movement therewith, one of said last driving members meshing with one of said first driving members and providing high speed forward and high speed reverse of the drive wheel and the other of said last driving members meshing with the other of said first driving members and providing low speed forward and low speed reverse of the drive wheel, one of said last driving members being shifted out of mesh with its cooperating driving member and the other into mesh with its cooperating driving member upon axial shifting of the shaft in one direction and the first of said last driving members being shifted into mesh with its cooperating driving member and the other out of mesh with its cooperating member upon axial movement of the shaft in the opposite direction.

2. In a tractor the combination of a main frame, a wheel frame having a drive wheel associated therewith, said wheel frame being rotatable through 180 degrees to turn the drive wheel around and reverse the direction of movement of the tractor, a vertically disposed shaft having driving connection with the drive wheel at its lower end, a pair of driving members at the upper end of said shaft, and a second pair of driving members one cooperable with one of said first driving members and providing high speed forward and high speed reverse of the drive wheel and the other of said second pair of driving members cooperating with the other of said first driving members and providing low speed forward and low speed reverse of the drive wheel.

3. In combination, a main frame, a wheel frame rotatably mounted therein, a traction wheel associated with said wheel frame, means for turning said traction wheel about a vertical axis to reverse the direction of movement of the machine, a power plant mounted upon the main frame remote from the axis about which the traction wheel is turned to reverse the direction of movement and in substantially the horizontal plane of the traction wheel, a driving connection between said power plant and said traction wheel, and a change speed mechanism interposed in said driving connection.

In witness whereof I hereunto subscribe my name this 7th day of April, A. D. 1920.

GREGORY C. DAVISON.